United States Patent [19]

Khungar et al.

[11] Patent Number: 5,346,943
[45] Date of Patent: Sep. 13, 1994

[54] SEALER COMPOSITION FOR WOOD, CONCRETE, POROUS MATERIALS

[75] Inventors: Sohan L. Khungar, Woodridge; L. Martin Graves, Jr., Bolingbrook; Robin M. Gryziecki, Aurora, all of Ill.

[73] Assignee: Amoco Corporation, Chicago, Ill.

[21] Appl. No.: 27,957

[22] Filed: Mar. 8, 1993

[51] Int. Cl.$^5$ .................. C08L 23/20; C08K 5/01; C08K 5/09; C08K 5/17

[52] U.S. Cl. ..................... 524/398; 524/399; 524/579; 524/773; 524/801; 524/804; 106/285

[58] Field of Search ............... 524/398, 399, 579, 773, 524/801, 804; 106/285

[56] References Cited

U.S. PATENT DOCUMENTS

| | | | |
|---|---|---|---|
| 2,402,331 | 6/1946 | Kvalnes | 524/773 |
| 3,036,977 | 5/1962 | Koch et al. | 524/315 |
| 4,176,109 | 11/1979 | Kaiya et al. | 524/315 |
| 4,983,454 | 1/1991 | Hiraki et al. | 428/416 |
| 5,049,186 | 9/1991 | Kawabata | 524/277 |
| 5,169,884 | 12/1992 | Lindemann et al. | 524/45 |

Primary Examiner—Paul R. Michl
Assistant Examiner—Andrew E. C. Merriam
Attorney, Agent, or Firm—Mary Jo Kanady; Wallace L. Oliver

[57] ABSTRACT

A water-based wax-free stable emulsion composition, useful as water sealer for wood, concrete and porous materials is disclosed. The water-based sealer composition forms a non-drying film that is water-repellant, flexible, self-sealing and allows passage of water vapor. The water-based sealer composition contains less than 400 grams per liter of volatile organic compounds. The water-based sealer composition is especially suited for above-grade applications in that it protects against absorption of water.

12 Claims, No Drawings

SEALER COMPOSITION FOR WOOD, CONCRETE, POROUS MATERIALS

BACKGROUND OF THE INVENTION

This invention relates to a novel sealer composition and to a method for its preparation. This invention also relates to a sealer composition containing less than 400 grams/liter volatile organic compounds (VOC). More particularly, it relates to an aqueous composition for the protection of wood, concrete, masonry and other porous materials to minimize the amount of water absorbed by the wood or other material to which it is applied. The invented composition can also be used as a parting agent, or bond breaker, or as a release agent for forms in concrete construction and as a protective coating to prevent corrosion of metal manufactures exposed to the elements of rain and/or snow in above-grade applications. The composition protects against the absorption of water and is particularly suited for sealer applications wherein reduced environmental pollution emissions are required.

DESCRIPTION OF THE PRIOR ART

A number of waterproofing and sealing compounds have been developed for wood, masonry, concrete and other porous materials. For example, water-based acrylic polymer wood sealers are known in the art. Acrylic polymer latex-based sealers exhibit desirable qualities such as good flexibility, good adhesion to many substrates and resistance to ultraviolet radiation. However, these acrylic polymer latex sealers suffer from one or more serious weaknesses, namely poor wet adhesion and poor barrier properties against water penetration. Attempts have been made to improve the water barrier properties of these latex sealers. For example, see U.S. Pat. No. 4,897,291 wherein a sealer composition for a wood product is disclosed which comprises an aqueous vehicle, a water-based emulsion of a styrene-butadiene copolymer, a carboxylated styrene-acrylic copolymer, a paraffin wax, and a water-soluble methyl siliconate. U.S. Pat. No. 4,340,524 teaches addition of a hydrophobic resin in a non-gelling organic solvent into an acrylic latex to improve its water resistance after a short cure period.

An example of a masonry sealing compound is taught in U.S. Pat. No. 3,546,007 wherein a thin coating of a composition comprising a mineral lubricating oil, a soap thickener and an oil-soluble polymer selected from the group consisting of atactic polypropylene, atactic propylene-ethylene copolymer and ethylene vinyl acetate copolymer. The composition is applied to prevent seepage and ground water from penetrating through masonry foundations.

These examples illustrate the wide utility of sealer compositions. A sealer composition can be waterproof in that it creates a condition which is impervious to water and water vapor, whether or not the water is under pressure, or a sealer composition can create a condition of water repellency wherein the sealer composition repels water without significantly reducing the permeability of the structure to the passage of water vapor.

Heretofore, hydrocarbon wax has found extensive application in water-proofing or otherwise protecting various materials. Hydrocarbon wax has been used because it remains solid at room temperature, has a definite melting point at relatively low temperatures and is hydrophobic. Hydrocarbon wax is usually impregnated in or coated on fibrous material such as wood, fabric, as well as articles of cement and the like. To effect impregnation or coating of the hydrocarbon wax, the wax is usually heated to melt, dissolved in a solvent, or emulsified in water. It has been found to be best applied as an emulsion, considering safety, economy and workability.

Although hydrocarbon wax is hydrophobic, its emulsion when coated and dried at room temperature does not create a water-proof surface. It is believed that the surface coated by the dried emulsion consists of a distribution of discrete wax particles with interstices which permit passage of water therethrough.

Liquid polybutadiene, polybutene, or a polyisobutylene have been combined with hydrocarbon wax to prepare a protective film which is substantially transparent, highly cohesive, water-resistant and waterproof. U.S. Pat. No. 4,468,254 teaches a wax composition comprising (1) 100 parts by weight of a hydrocarbon wax having a melting point of 40°–120° C. and (2) 3–25 parts by weight of a polymer of the group consisting of a liquid polybutadiene having a number average molecular weight of 500–10,000, a polybutene having a number average molecular weight of 300–3,000, and a polyisobutylene having viscosity average molecular weight of 20,000–50,000, the compositions being emulsified in water.

U.S. Pat. No. 4,594,109 discloses an aqueous composition for the protection of paint surfaces which comprises (a) a solid emulsion component composed of (1) an oxygen-containing wax, (2) a polybutene and (3) a silicone oil; (b) a powdery emulsion component composed of (4) substantially white-colored fine powder of a silicon-containing inorganic-material and (5) white-colored fine powder of a silicon-free inorganic or organic material and (c) an emulsifier component. However, water-based wax-powder dispersions are accompanied by drawbacks in that the barrier coats are susceptible to separation, as is noted in U.S. Pat. No. 5,049,186.

Water-based wax emulsions, although they do not suffer from pollution or safety problems due to the absence of a hydrocarbon solvent, suffer from the problems of dryability upon application to a surface and dispersability. In addition, such wax emulsion compositions are required to have mutually-contradictory properties; they are required to be emulsifiable in aqueous compositions but water repellent when applied to a surface and exposed to rain and moisture. U.S. Pat. No. 5,049,186 teaches a disperse phase composition containing a petroleum wax in conjunction with an oxygen-containing wax, an ethylene/α-olefin copolymer and a fatty acid metal salt, and an emulsifier component overcomes the aforementioned problems. In an example, calcium stearate as the fatty acid metal salt and morpholine as an emulsifier were used. A comparative composition containing polybutene instead of an ethylene/α-olefin copolymer gave a poor barrier coat test. The barrier coat test required exposure of coated plates to sunlight in summer for three months. Some changes were observed in the polybutene-wax barrier coat as compared with the ethylene/α-olefin copolymer coat.

U.K. Patent Application GB 2,018,261A teaches a composition for sealing or caulking joints, especially of foundry or metallurgical equipment. The composition comprises a binder and inorganic filler material. The binder comprises a non-drying oil, a gelling agent, and a liquid polymer of molecular weight of from 2,000 to 10,000. Suitable gelling agents include aluminum soaps of stearic acid such as aluminum stearate. A preferred liquid polymer is polybutene of 2,000 molecular weight. The binder composition is prepared by mixing with heating. The resulting sealer composition containing inorganic filler of up to 80%, when extruded into strings, demonstrates minimal adhesiveness, presumably because of the large percentage of inorganic filler present, despite the inclusion of polybutene which is typically sticky.

Polybutenes are non-drying unsaturated hydrocarbons which are hydrophobic in nature. Therefore formulation of polybutenes in a sealer compound could improve water-resistance. It is also known that aluminum stearates react with hydrocarbons to form gels, such as taught in U.K. Patent Application GB 2,018,261A, wherein a polybutene composition is gelled in the presence of a non-drying oil, such as a mineral oil.

Metal soaps, such as aluminum stearate are well-known to effect the gelation of oils and polar organic solvents when heated with these liquids or formed in situ. Upon cooling, the resulting solutions set to a gel (Kirk-Othmer, 3rd Ed., Vol. 8, p. 45). These gels have been used in greases, lubricants, thickeners and taught as solvent-based sealers. Aluminum stearate is well-known as a moisture repellant in cosmetics.

Aqueous emulsions containing polybutenes have been taught in the prior art. U.S. Pat. No. 4,594,109 teaches an aqueous polybutene composition but the aqueous emulsion comprises predominantly hydrocarbons other than polybutenes, specifically 100 parts by weight of an oxygen-containing wax to 0.1–60 parts by weight of a polybutene. Oxygen-containing waxes having an oxygen content not less than 3.0% by weight are taught as being satisfactorily emulsified with the aid of a small amount of emulsifier. Examples teach a maximum ratio of wax to polybutene of 4:1. U.S. Pat. No. 4,468,254 teaches a wax emulsion comprising a hydrocarbon wax admixed with a liquid polymer selected from the group consisting of polybutadiene, polybutene and polyisobutylene, 100 parts by weight of hydrocarbon wax to 3–25 parts by weight of the liquid polymer.

However, despite the numerous attempts to modify sealer compositions containing hydrocarbon wax with other components, the problems inherent in a wax composition remain to some degree. Wax crystals can be fragile and rupture through use, thus creating fissures and breaks in the coating. Also, although wax is hydrophobic, it is considered that a surface coated by a dried wax emulsion consists of a distribution of discrete wax particles with interstices which permit passage of water. A wax coating is also subject to abrasion from use which can impair the wax sealer properties.

It is an object of this invention to provide a water-based sealer composition which is wax-free, which upon application forms a non-drying film that is a water-repellant coating with good flexibility and permits swelling of a substrate without cracking of the coating. It is further an object of this invention to provide a coating which is self-sealing to cracks in the surface coating and yet allows passage of water vapor. It is further an object of this invention to provide a sealer composition containing less than 400 grams/liter volatile organic compound (VOC) and which reduces the possibilities of environmental pollution and fire hazard.

SUMMARY OF THE INVENTION

This invention relates to a water-based, wax-free stable emulsion composition useful as a sealer for wood, concrete and porous materials. The sealer composition comprises polybutene, a heavy metal soap, an amine in a minimal amount of solvent as a gel which in the presence of an emulsifying-stabilizing agent forms a stable water emulsion for application to a substrate. The emulsifying-stabilizing agent comprises an acrylic acid polymer cross-linked with a polyalkenyl polyether or a diester of a linear alcohol of from 6 to 12 carbon atoms and adipic acid. The water-based sealer composition forms a non-drying film that is water-repellant, flexible, self-sealing and allows passage of water vapor. The water-based emulsion contains less than 400 grams/liter volatile organic compounds.

DETAILED DESCRIPTION OF THE INVENTION

This invention comprises a water-based wax-free sealer for wood, concrete and other porous materials for above-grade applications which contains a minimum of organic solvent and reduces the hazards of environmental pollution and fire. The water-based composition is a water emulsion of an organic solvent-based composition which is prepared from a linear polymer of butene and a heavy metal.

The $C_4$ linear polymer of butene is a non-hydrogenated liquid homopolymer with a number average molecular weight range of from about 300 to about 10,000. These polymers are available as polybutenes from polymerization of refinery butenes, e.g., isobutylene, cis-butene-2, and butene-1 generally present with butane in a $C_4$ fraction. Commercially available since about 1940, such $C_4$ fractions with or without added isobutylene or isobutylene-rich concentrates typically have been polymerized in the presence of Friedel-Crafts catalysts, such as aluminum halides, feric halides, zinc halides, boron halides (i.e., $BF_3$), tin halides, mercuric halides, and titanium halides.

The wide range in viscosity and molecular weight depends, as is known, on polymerization temperature, catalyst and its concentration, and on the olefin content of the feed.

The resultant viscous polybutenes are permanently liquid, possess tack and stickiness and have found use as components of caulking compounds, adhesives, electric cable insulating oils, as a raw material for manufacture for motor oil additives and as a component of wax compositions to improve waterproofness of wax films. A characteristic which has limited application of polybutenes in films and coatings has been the sticky film or coating which results if the percentage of polybutene in the formulation is greater than about 25%. The viscous polybutenes are employed in the composition of the present invention in an amount to about 10% by weight, or less, of the weight of the water emulsion.

The heavy metal soap or thickening agent, preferably an aluminum soap, employed in the sealer of the present invention is used in an amount ranging from about 1 to about 5%, and more particularly from about 1 to about 3% based upon weight of the final composition. The aluminum soap is most often a soap of a saturated or unsaturated higher aliphatic carboxylic acid containing from about 12 to 20 carbon atoms; e.g., stearic, oleic, ricinoleic or palmitic acid and mixtures thereof. Mixed aluminum soaps, which are soaps obtained from a higher carboxylic acid and from a carboxylic acid with a lower molecular weight may be used. Examples of such aluminum soaps include soaps of benzostearic, acetopalmitic, toluostearic, etc. An aluminum stearic acid soap is preferred. More preferably, an aluminum distearic acid soap with no more than about 5% aluminum monostearic acid soap present is preferred.

The process of preparing the sealer composition comprises first the preparation of a gel of the polybutene component and the aluminum stearate soap to which is added an amine and an organic hydrocarbon solvent which can be mineral spirits or turpentine. The resulting gel comprising a fatty acid and an amine or an alkanolamine, is converted into a stable water emulsion with the aid of an emulsifying-stabilizing agent selected from the group consisting of an acrylic acid polymer crosslinked with a polyalkenyl polyether or a low molecular weight ester of adipic acid. The presence of the amine serves to reduce the viscosity of the gel to less than about 5000 centipoise at room temperature, measured by a Brookfield viscometer, spindle No. 2 at 0.5 rpm. The amine is present in an amount of from about 0.01 wt. % to about 2.0 wt. %.

It is essential for uniform application of the sealer composition that a stable emulsion be prepared despite the hydrophobic characteristics of a $C_4$ olefinic linear polymer of butene and a metal soap. Otherwise the emulsion will separate and/or break into its components, thus handicapping the mechanical application of the sealer composition to a substrate and the film forming properties of the sealer composition. It has been found that a stable gel of a $C_4$ olefinic linear polymer of butene and a metal soap can be emulsified to form a stable emulsion with addition of a emulsifying-stabilizing agent of from about 0.02 to about 0.05 weight % of the weight of the water-based emulsion wherein the emulsifying-stabilizing agent is an acrylic acid polymer crosslinked with a polyalkenyl polyether or a low molecular weight polyester. A suitable emulsifying-stabilizing agent is one of a Carbopol ® 1600-series copolymer, B. F. Goodrich Company, Specialty Polymers & Chemical Division, Calvert City, Ky., or a diester of a $C_6$ to $C_{12}$ linear alcohol and adipic acid, Werner G. Smith, Inc., Cleveland, Ohio.

To test the effectiveness of various emulsifier agents, a typical formulation comprising polybutene, aluminum stearate, triethylamine and a solvent, either mineral spirits or turpentine, was prepared as a gel. The gel composition was emulsified in water in the presence of an emulsifying agent. The prepared water emulsions of a polybutene and aluminum stearate either separated in periods of as short as 10 minutes to several hours or the emulsion broke. A stable emulsion resulted only with addition of an acrylic acid copolymer crosslinked with a polyalkenyl polyether, a Carbopol ® copolymer, or a $C_6$ to $C_{12}$ linear alcohol diester, Smithol 50.

Requirements for successful application of Carbopol ® copolymers require a polar medium such as water, a pH of 4 or 5 or higher, the presence of a low level of soluble salts, and a temperature which does not exceed 85° C.

The acrylic acid copolymer crosslinked with a polyalkenyl polyether acts as a primary emulsifier and as an emulsion stabilizer. An amine preferably is present as a nonionic surfactant to provide a pH within the range of about 7 to 10. The emulsified composition does not include a high level of soluble salts although an amine salt is present.

The constituents of the composition of the invention will now be described in further detail:

A suitable $C_4$ olefinic linear polymer of butene is one of a group of liquid polybutadiene, polybutene, and polyisobutylene. The liquid $C_4$ olefinic linear polymer of butene has a number average molecular weight of 300–10,000, preferably 800–5,000. Polymers of lower number average molecular weight than 300 would result in a weak and less water resistant coating film when applied to a substrate, and greater than 10,000 would cause difficulty in emulsifying the composition in water and would be tacky. Specific examples of the liquid polybutadiene are not only low homopolymers of butadiene, but also include copolymers of butadiene and one or more of conjugated diolefins of 4–5 carbon atoms such as isoprene and piperylene, and low molecular weight copolymers of butadiene, with or without said conjugated diolefins, and aliphatic or aromatic vinyl monomers having an ethylene unsaturation such as isobutylene, diisobutylene, styrene, α-methyl styrene, vinyl toluene, and divinyl benzene. These butadiene polymers may be obtained by any conventional method. For example, an anionic polymerization method may be employed in which butadiene alone or with conjugated diolefins of 4–5 carbon atoms is polymerized with styrene, α-methyl styrene, vinyl toluene or divinyl benzene in an amount of less than 50 mol % based on butadiene in the presence of an alkali metal or an alkali organometal catalyst at 0°–100° C. In such instance, a chain transfer polymerization method is applicable in which an organometal compound such as benzyl sodium is used as catalyst and toluene or other compounds having alkylaryl groups is used as a chain transfer agent so as to obtain a light color polymer which has a controlled molecular weight and minimum gel as disclosed in U.S. Pat. No. 3,789,090.

Polybutene, which can be a component useful in the invention, has a number average molecular weight of 300–3,000, preferably 450–1,500. Polybutene departing from this range below 300 would be a liquid of low viscosity, resulting in a very weak film. Polybutene of greater than 3,000 in this molecular weight would be too viscous and tacky, and hence difficult to be emulsified in water.

The polybutene useful in this invented composition has its source from mixtures of butene-1, butene-2, isobutylene and butanes which may be processed by any suitable known methods. A typical example of such known method comprises reacting a starting material of butane-butene fraction (available as side-product during the cracking of naphtha into ethylene or propylene) at −30° to +30° C. in the presence of a Friedel-Crafts catalyst such as aluminum chloride, magnesium chloride, boron fluoride, titanium tetrachloride and complexes thereof, or with or without addition of an organic halide or chloric acid, in which instance no solvent is required as butane and unreacted olefins act as the solvent. The resulting polybutene is usually settled in a tank to remove the catalyst and is, if necessary, washed with alkali, water, nitric acid, sulfuric acid, oxalic acid and the like, or further treated with an aluminum oxide and activated clay to complete removal of all residual catalyst particles. The treated product may be washed to separate unreacted gas, stripped of light polymers and further, if necessary, refined. In the present invention, it is possible to use a hydrogenated polybutene obtained by hydrogenating the double bonds of the polybutene by methods already known in the art, such as by using nickel as a catalyst.

Polyisobutylene, another component which may be useful in the invented composition has a viscosity average molecular weight of 20,000–50,000, preferably 20,000–40,000. It is a highly viscous, low-fluidity, semi-liquid material. Polyisobutylenes of a viscosity average molecular weight exceeding 50,000 are a semi-rubber which is hard to dissolve or emulsify in the usual manner so therefore are less preferred. The polyisobutylene which may be used in the invention is prepared by the polymerization of isobutylenes available from a butane-butene fraction or from dehydration of tertiary butylalcohol or diacetone alcohol which may be refined by molecular sieve. The isobutylene feed is polymerized at $-80°$ to $150°$ C., as is well known, with the addition of ethylene or propane as diluent and boron trifluoride or aluminum chloride.

The emulsifier useful in the solvent colloid preparation is a suitable cationic emulsifier which includes amines such as triethylamine, triethanolamine, morpholine and the like.

In the water-emulsion preparation, the surfactant may be chosen from a wide variety of usual surface active agents. Nonionic, cationic and anionic emulsifiers are all usable. Suitable nonionic emulsifiers include sorbitan esters (Span®20, Span®40, Span®60, Span®80, Tween®60, Tween®80) and mixtures thereof. (ICI Americas, Inc., Wilmington, Del.) When a cationic emulsifier is used, its effect can be enhanced by adding an anionic emulsifier, e.g., isostearic acid, oleic acid, lauric acid, tall oil fatty acids, tallow fatty acids, hydrogenated tallow fatty acids, in an amount less than the equivalent amount of the cationic emulsifier. As noted above, it is essential for the preparation of a stable emulsion that the emulsion contain a suitable emulsifying-stabilizing agent selected from the group consisting of an acrylic acid copolymer crosslinked with a polyalkenyl polyether or a low molecular weight ester selected from the group consisting of an ester of a $C_6$ to $C_{12}$ linear alcohol and a mono-, di- and tricarboxylic acid of 6 to 12 carbon atoms.

The solvent in the gel preparation can be mineral spirits or turpentine. The mineral spirits are of petroleum origin not less 10% of which distill below 175° C. and which not less than 95% distill below 240° C. The turpentine is preferably steam distilled from gum turpentine. Mineral spirits and steam distilled turpentine are commercially available.

Gel formation requires the presence of a heavy metal soap formed by metals heavier than sodium, e.g., aluminum, calcium, cobalt, lead and zinc, and a fatty acid of from 12 to about 20 carbon atoms. A preferred heavy metal soap is an aluminum distearate commercially available as about 95% distearate and about 5% monostearate.

A fluorinated surfactant can be added to the formulation to decrease water absorption. A suitable surfactant is Fluorad® FC-430, or Fluorad® FC-129, Minnesota Mining and Manufacturing Company, (3M), St. Paul, Minneapolis, Minn.

In summary, this invention relates to a water-based wax-free emulsion composition useful as a sealer for wood, concrete and porous materials which comprises a $C_4$ linear polymer of butene with a number average molecular weight of from about 300 to about 10,000, a metallic soap selected from the group consisting of a soap formed from a metal selected from the group consisting of aluminum, calcium, cobalt, lead and zinc, an amine and an organic hydrocarbon solvent present in an amount less than 35% by weight of the emulsion composition wherein a composition of said $C_4$ linear polymer of butene, metallic soap, amine and organic hydrocarbon solvent is first prepared as a colloidal gel which is then emulsified in water in the presence of an emulsifying agent selected from the group consisting of cationic, anionic and nonionic surface agents preferably selected from isostearic acid, and sorbitan monolaurates, and in the further presence of a emulsifier-stabilizer agent selected from the group consisting of an acrylic acid polymer crosslinked with a polyalkenyl polyether and a low molecular weight diester of a $C_6$ to $C_{12}$ linear alcohol and a carboxylic acid of from 6 to 12 carbon atoms.

The following examples are exemplary only and are not to be construed as limiting the scope of the invention.

EXAMPLE I

The precursor gel was prepared in the following manner. Polybutene, aluminum stearate (technical), triethylamine, and turpentine (steam distilled) were added in the following procedure to a one-half gallon stainless steel beaker fitted with an electric heating mantle and equipped with a stirrer.

| Gel Component | Parts By Weight | Grams | % Weight |
|---|---|---|---|
| Polybutene[1] | 1.000 | 200.00 | 18.05 |
| Al Stearate[2] | 0.183 | 36.60 | 3.30 |
| Triethylamine[3] | 0.085 | 17.00 | 1.53 |
| Turpentine[4] | 4.272 | 854.40 | 77.11 |
|  | 5.540 | 1108.00 | 99.99 |

Note:
[1]H-300 polybutene, number average molecular weight 1340, Amoco Chemical Company, Chicago, IL.
[2]Aluminum stearate, technical, BDH Chemicals, Ltd., Poole, Dorset-BH 12 4NN, Great Britain
[3]Triethylamine, Baker Analyzed Reagent, J. T. Baker Chemical Co., Philadelphia, PA.
[4]Turpentine, steam distilled, technical grade, added to 22.89% solids content.

The formulation was heated to 127° C. (260° F.) to about 182° C. (350° F.) to mix the formulation. The mixing temperature initially was measured by means of a thermocouple placed next to the wall of the beaker, between the wall of the beaker and the heating mantle. After mixing for about one hour at about 3000 rpm with a Cowles Series 2000 mixer, the thermocouple was inserted into the mixture and the temperature was raised to at least 160° C. (320° F.) within the range of from about 160° C. (320° F.) to about 182° C. (360° F.) wherein limited gelling of the formulation occurred. Additional gelling occurred but the mixture still remained fluid despite the application of heat. With the addition of turpentine, 427.20 grams, 50% of total final amount, the mixture thickened but addition of the remaining turpentine, 427.20 grams, and triethylamine, 17 grams, caused the mixture to become less thick and more fluid. The mixture was then filtered through a paint strainer, mesh size 44×36, into a one-half gallon stainless steel beaker. A quantity of the material which did not flow readily remained upon the walls of the mixing vessel as a gel. The gelled product was viscous and clear.

EXAMPLE II

A second batch of the precursor gel was prepared in the procedure of Example I but gelling temperature was increased to 170°–180° C. (330°–356° F.). The formulation gelled as a thin gel within 45 minutes and gelled more firmly with addition of turpentine, 427.2 grams. Addition of the remaining turpentine, 427.20 grams and triethylamine, 17 grams, diluted the thinned mixture to a gel-like consistency. The material was then filtered through a paint strainer, mesh size 44×36, where the gelled material clogged the paint strainer. The gelled product was viscous and clear.

EXAMPLE III

In the procedure of Example II, a gel was prepared with an increased amount of aluminum stearate which was increased to 40 wt. % of the polybutene. The triethylamine was increased in proportion to the aluminum stearate. The turpentine was decreased to give 34.6 wt. % solids.

| Gel Component | Parts By Weight | Grams | % Weight |
|---|---|---|---|
| Polybutene H-300 | 1.000 | 240.00 | 21.82 |
| Al Stearate | 0.400 | 96.00 | 8.73 |
| Triethylamine | 0.186 | 44.64 | 4.06 |
| Turpentine | 2.998 | 719.52 | 65.40 |
|  | 4.584 | 1100.16 | 100.01 |

All components were the same as indicated in Example I.

The gelling process occurred within about 25 minutes at a temperature within the range of from 170°–180° C. (330°–356° F.). The gelled product was more viscous and less clear than the gelled product of Examples I and II. Addition of turpentine, 359.76 grams appeared to reduce the viscosity but the mixture was not a clear material. The addition of triethylamine, 44.64 grams, did not cause the mixture to become less viscous. Addition of more turpentine, 359.76 grams, also failed to reduce the viscosity but with additional mixing, the mixture did become clear. The final product could not be filtered because of its high viscosity and the presence of unreacted triethylamine was evidenced by odor.

EXAMPLE IV

In the procedure of Example I, an emulsion base was prepared. An emulsifying agent and water were then added. The formulation was as follows:

| Gel Component | Parts By Weight | Grams | % Weight |
|---|---|---|---|
| Polybutene H-300[1] | 1.000 | 27.08 | 7.311 |
| Al Stearate[2] | 0.183 | 4.95 | 1.336 |
| Triethylamine[3] | 0.085 | 2.30 | 0.621 |
| Turpentine[4] | 4.272 | 115.67 | 31.230 |
| Gel Total | 5.540 | 150.00 | 40.498 |
| Emulsion Component |  |  |  |
| Witconol TM 2650[5] | 0.100 | 2.71 | 0.732 |
| D.I. Water[6] | 8.038 | 217.67 | 58.769 |
| Total | 13.678 | 370.38 | 99.999 |

Note:
[1]Polybutene H-300, Amoco Chemical Company, Chicago, IL.
[2]Aluminum stearate, technical grade, BDH Chemicals, Ltd., Poole, Dorset - BH 12 4NN, Great Britain
[3]Triethylamine, Baker Analytical Reagent, J. T. Baker Chemical Co., Philadelphia, PA.
[4]Turpentine, steam distilled, technical grade
[5]Emulsifier agent, Witco Corporation, Chicago, IL.
[6]Deionized water In the emulsification procedure, 150 grams of the emulsion base gel were added to a 1.2 liter stainless steel beaker. The beaker was suspended in a water bath. The emulsifying agent, Witconol 2650, was added to the emulsion base heated to 80°–90° C. The beaker was taken out of the bath and put under a Cowles mixer, Model 84. Water, at 90° C., was added slowly while mixing at 4000–5000 rpm over a period of about 8 minutes. Mixing at 4000–5000 rpm was continued for an additional 7 minutes for a total of 15 minutes mixing time.

Upon standing overnight at room temperature, the gel emulsion separated into two phases.

To the previously separated emulsion, there was added, with mixing, additional surfactant, Witconol 2650 in the following formulation:

| Component | Parts By Weight | Grams | % Weight |
|---|---|---|---|
| Polybutene H-300 | 1.000 | 23.47 | 7.26 |
| Aluminum Stearate | 0.183 | 4.29 | 1.33 |
| Triethylamine | 0.085 | 1.99 | 0.62 |
| Turpentine | 4.272 | 100.26 | 31.01 |
| Witconol 2650 | 0.200 | 4.70 | 1.46 |
| D.I. Water | 8.038 | 188.64 | 58.34 |
| Total | 13.778 | 323.35 | 100.02 |

The emulsion with the added surfactant did not separate upon standing overnight. The emulsion showed a slight separation after 14 days at room temperature.

EXAMPLE V

In the gel and emulsion formulation and procedure of Example IV, commercially available emulsifying agents were tested for ability to sustain at room temperature a gel emulsion of polybutene H-300 and aluminum stearate in the presence of triethylamine and turpentine. The results are in Table I.

TABLE I

Stability of Polybutene-Aluminum Stearate Gel Emulsion With Emulsifying Agents

| Emulsifying Agent | Emulsion Stability Separation into 2 Phases |
|---|---|
| Brij ® 700 |  |
| Iconol TDA-10 | Within 90 minutes |
| Formula Amount | Initial - within 60 minutes |
| Twice Formula Amount | 24 hrs - two phases |
| Witconol 2650 | 24 hrs - two phases |
| Iconol TDA - 10 | 24 hrs - two phases |
| Sorbitan Monolaurate |  |
| Formula amount | 8 hrs - two phases |
| Twice formula amount | 17 days - two phases |
| Witconol/Emerest ® 2640 | Initial - within 10 minutes |
| Triton ® X-45 |  |
| Formula Amount | Initial - within 60 minutes |
| Twice Formula Amount | 14 days - two phases |
| PEG 600 Monolaurate, (Stepan) |  |

TABLE I-continued

Stability of Polybutene-Aluminum Stearate Gel Emulsion With Emulsifying Agents

| Emulsifying Agent | Emulsion Stability Separation into 2 Phases |
|---|---|
| Formula Amount | Initial - 16 hours |
| Twice Formula Amount | 48 hrs - two phases |
| Triton ® X-100 | |
| Formula Amount | Initial - 16 hours |
| Twice Formula Amount | Within 60 minutes |
| Oleic Acid | 2 hrs - two phases |
| Isostearic Acid | Within 10 minutes |
| Sorbitan Monolaurate (.75%) + Isostearic Acid (.25%) | Within 15 minutes |
| Tween ® 60 | Within 60 minutes |
| Tween ® 60 (50%) + Sorbitan Monolaurate (50%) | Within 10 minutes |

The above results indicate that many commercial emulsifying agents available to practitioners of the art do not stabilize gel water-emulsions of hydrophobic polybutene and hydrophobic aluminum stearate over an extended period.

EXAMPLE VI

In a modified procedure of Example IV, an emulsion base Sample No. 15931-16, was prepared but using mineral spirits instead of turpentine. An emulsifying agent comprising a mixture of isostearic acid and sorbitan monolaurate was added. After the emulsion was formed with the emulsifying agent to prepare Sample No. 15931-17, a stabilizing agent, a polyalkenyl polyether, Carbopol ® 1622, B. F. Goodrich company, Cleveland, Ohio was added. Formulations and procedure were as follows:

| Gel Component | Parts By Weight | Grams | % Weight |
|---|---|---|---|
| Polybutene H-300[1] | 1.000 | 54.15 | 6.81 |
| Al Stearate[2] | 0.183 | 9.91 | 1.25 |
| Triethanolamine[3] | 0.085 | 4.6 | 0.58 |
| Mineral Spirits[4] | 4.272 | 231.34 | 29.10 |
| Gel Total Emulsion Component | 5.540 | 300.00 | 37.74 |
| Isostearic Acid[5] | 0.150 | 8.12 | 1.02 |
| Sorbitan Monolaurate[6] | 0.050 | 2.71 | 0.34 |
| Distilled Water | 8.940 | 484.12 | 60.90 |
| Total | 14.680 | 794.95 | 100.00 |

Note:
[1] Amoco Chemical Company, Chicago, IL.
[2] No. 5503, Mallinckrodt Specialty Chemicals Company, St. Louis, MO.
[3] Triethanolamine, TEXACO Chemical Co., Austin, TX.
[4] Mineral Spirits, SHELL Corporation, Houston, TX.
[5] Isostearic acid, Unichema Company, Chicago, IL.
[6] Sorbitan monolaurate, Mazer Chemical Company, Chicago, IL.

Emulsion gel base component, 300.00 grams, was placed in a 2 liter stainless steel beaker equipped with a Cowles Series 2000 mixer and heated in a water bath to 80° C. while adding the isostearic acid and sorbitan monolaurate. Water at 90° C. was then added slowly over a 10 minute period while mixing at 2500–3000 rpm. The mixture was mixed for another five minutes, for a total of 15 minutes to form an emulsion. The emulsion was allowed to cool to room temperature. After 24 hours a supernant layer of fluid formed above the gel phase due to syneresis. The emulsion did not separate into separate phases. The sample was designated Example VI-A, Sample No. 15931-17-1.

An amount of a polyalkenyl polyether, Carbopol ® 1622, 0.04 grams, 0.02 wt. % of the final emulsion was placed in a 600 ml stainless steel beaker equipped with a Cowles mixer. A portion of the emulsion, 200.00 grams, was added to the beaker and mixed at room temperature and low speed for 10 minutes. The product Example VI-B, Sample No. 15931-17-2 was allowed to stand for a period of 24 hours. A supernatant layer of fluid appeared above the gel phase due to syneresis. The emulsion did not separate into separate phases.

An amount of a coating additive, 3M's Fluorad ® additive FC-430, 0.04 grams, 0.02 wt. % of the final emulsion was placed in a 600 ml stainless steel beaker equipped with a Cowles mixer. A portion of the emulsion, 200.00 grams was added to the beaker and mixed at room temperature and low speed for 10 minutes. A ⅛ inch oil layer formed on top of the sample within 30 minutes. After 24 hours, the emulsion composition, Example VI-C had separated into three phases. The sample was No. 15931-17-3.

An additional 0.06 grams of polyalkenyl polyester, Carbopol ® 1622, 0.03 wt. %, of the final emulsion was placed in a 600 ml stainless steel beaker equipped with a Cowles mixer. Example VI-B, Sample No. 15931-17-2, 200 grams, was added to the beaker. The mixture was heated in a water bath to 50° C. and mixed at low speed for 10 minutes. After 24 hours, a supernatant layer of fluid had appeared above the gel phase of the sample due to syneresis. The emulsion Example VI-D, Sample No. 15931-17-4, did not separate into separate phases.

EXAMPLE VII

The procedure of Example IV was repeated with the following formulation:

| Gel Component | Parts By Weight | Grams | % Weight | % Solids |
|---|---|---|---|---|
| Polybutene H-300 | 1.000 | 27.08 | 7.31 | 7.31 |
| Al Stearate[1] | 0.183 | 4.95 | 1.34 | 1.34 |
| Triethylamine | 0.085 | 2.30 | 0.62 | 0.62 |
| Mineral Spirits | 4.272 | 115.67 | 31.23 | |
| Gel Total Emulsion Component | 5.540 | 150.00 | 40.50 | |
| Refined Linseed Oil | 0.100 | 2.71 | 0.73 | 0.73 |
| Deionized Water | 8.040 | 217.69 | 58.77 | |
| Total | 13.680 | 370.40 | 100.00 | 10.02 |

Note:
[1] No. 5503, Mallinckrodt Specialty Chemicals Co., St. Louis, Mo.

Gel component, 150.00 grams, was added to a 1.2 liter stainless steel beaker. The refined linseed oil was added and the mixture heated to 70°–80° C. in a water bath. The beaker was then put under a Cowles mixer. The deionized water was then added slowly over 8 minutes while mixing at 200–300 rpm. Mixing was continued for 7 minutes. An oil phase was visible, approximately of 0.5 inch, within 15 minutes. The product was designated 15931-24 emulsion sample.

To 200.00 grams of the gel base, No. 15931-25, was added 0.02 wt % polyalkenyl polyether Carbopol ® 1622, 0.04 grams. The mixture was mixed for 10 minutes at slow speed, less than 2000 rpm. An oil appeared within 24 hours upon the surface of the gel due to syneresis. The emulsion did not separate into separate phases. The sample was designated 15931-24-2.

To another 200.00 grams of sample 15931-24 there was added 0.04 grams Fluorad ® FC-129, approximately 230 ppm. The resulting mixture was remixed for 5 minutes by hand, stirring with a stainless steel spatula. An oily fluid separated from the gel within about 30 minutes, appearing on the surface of the gel. This sample was 15931-24-3.

To 200 grams of sample 15931-24-2, there was added 0.04 grams, Fluorad® FC-129, approximately 230 ppm. The sample was remixed for 5 minutes by hand, stirring with a stainless steel spatula. An oily fluid separated from the gel within about 30 minutes, appearing in the surface of the gel. This sample was 15931-24-4.

EXAMPLE VIII

Polybutene emulsions were prepared according to the following formula:

| Gel Component | Parts By Weight | Grams | % Weight |
|---|---|---|---|
| Polybutene H-300 | 1.000 | 27.08 | 7.31 |
| Al Stearate[1] | 0.183 | 4.95 | 1.34 |
| Triethylamine | 0.085 | 2.30 | 0.62 |
| Mineral Spirits | 4.272 | 115.66 | 31.24 |
| Gel Total | 5.540 | 149.98 | 40.51 |
| Emulsion Component | | | |
| Isostearic Acid | 0.100 | 2.71 | 0.73 |
| Deionized Water | 8.040 | 217.69 | 58.76 |
| Total | 13.680 | 370.28 | 100.00 |

Note:
[1]No. 5503, Mallinckrodt Specialty Chemicals Co., St. Louis, Mo.

After mixing according to the procedure of Example IV, an emulsion was formed which separated in less than 10 minutes. To a portion of the separated composition, 166.0 grams, there was added 0.083 grams, 0.05% wt. %, Carbopol® 1622. The mixture was heated to 50° C. (122° F.) and mixed for 10 minutes at 2000–3000 rpm. A stable emulsion was formed, Sample No. 15735-143-3. The polybutene emulsion was tested as a wood sealer against moisture absorption by a modified version of ASTM D 3502-76.

Test specimens of cedar, one inch square by three inches long were oven-dried for 24 hours at 50° C. (122° F.). A screw eye, weight approximately 1 gram, was inserted into one end to form a specimen assembly. Each specimen was weighed and stored in a desiccator over calcium sulfate until being painted with a coating of the polybutene emulsion.

Each wood block test specimen was coated with the polybutene emulsion on all six sides with a brush, then hung on a drying rack in a hood for 24 hours to dry. Each test sample was prepared in duplicate.

Each test sample after drying was recoated once with the polybutene emulsion and hung to dry again for 24 hours. Each test sample was then weighed. A rod was inserted through the eye screw and each test sample was placed in a 16 oz. glass container, the rod suspending the test sample in the middle of the container. Weights were hung on the ends of each rod to secure the rod's position. Water was slowly added to each container without any water being poured directly on the test sample. The test specimens floated in the water and tilted to one side. The water level was raised until one top edge of the test sample was immersed in water but the screw hole of the eye screw was dry to prevent water absorption into the interior of the test sample by the screw hole. Tap water used had a hardness of less than 300 grains. The test samples remained immersed in water for 24 hours. Temperature was 22° C. The test samples were removed from the water, dried with absorbent paper and reweighed.

Percent weight gain was determined, [(final weight less coated weight) divided by (dry weight plus coating weight less weight of the screweye)] times 100. Sample number was 15735-143-3. Results are in Table II.

TABLE II

| | Water Absorption and Coating Conditions | | |
|---|---|---|---|
| Step | Component | Sample No. 15735-143-3 | |
| A. | Block-Screw Eye Assembly | 66 | 66A |
| B. | Assembly Plus Coating | 17.47 g | 17.72 g |
| C. | Weight of Coating | 1.20 g | 1.16 g |
| D. | Coating Weight-% of Total | 7.86% | 7.46% |
| E. | Weight After Immersion | 19.72 g | 20.11 g |
| F. | Water Absorbed-Weight | 2.25 g | 2.39 g |
| G. | Water Absorbed-% | 13.66% | 14.29% |
| H. | Water Absorbed-% Average | 13.98% | |
| | Condition of Coatings | | |
| I. | After 24 hours | Slight Tack | Slight Tack |
| J. | After 48 hours | Slight Tack | Slight Tack |

EXAMPLE IX

The formulation and procedure of Example VI were used to prepare a series of samples. The initial product No. 15931-17, was divided into four batches, three of 200 grams each and one of 300 grams. The 300 gram batch, No. 15931-17, was retained as a control. To one batch, No. 15931-17-4, there was added, with low speed mixing for 10 minutes at 50° C., 0.10 grams of Carbopol® 1622 0.05% of total weight of the emulsion. In the same procedure, 0.04 grams, 0.02 wt % of the emulsion, of FC-430 was added to the emulsion, No. 15931-17-3. Each batch was divided into two equal parts and tested by the procedure of Example VIII. A test specimen of cedar, to which no coating was applied to the raw wood was also tested as a blank to determine application response to each coating applied. Results are in Table III.

TABLE III

| | Cedar Block Water Absorption | | | | | | |
|---|---|---|---|---|---|---|---|
| | Blank-No Coating | 15931-17 No Carbopol® | | 15931-17-4 Plus Carbopol® | | 15931-17-3 Plus FC-430 | |
| Step[1] | 69 | 70 | 70A | 71 | 71A | 72 | 72A |
| A. | 14.85 g | 14.99 g | 14.98 g | 14.94 g | 14.52 g | 15.03 g | 14.84 g |
| B. | 15.70 g | 16.40 g | 16.33 g | 16.28 g | 15.90 g | 16.61 g | 16.46 g |
| C. | 0.85 g | 1.41 g | 1.35 g | 1.34 g | 1.38 g | 1.58 g | 1.62 g |
| D. | 6.13% | 10.06% | 9.63% | 9.59% | 10.18% | 11.23% | 11.68% |
| E. | 23.76 g | 19.58 g | 19.92 g | 19.99 g | 19.52 g | 18.82 g | 18.43 g |
| F. | 8.06 g | 3.18 g | 3.59 g | 3.71 g | 3.62 g | 2.21 g | 1.97 g |
| G. | 54.76% | 20.62% | 23.36% | 24.23% | 23.23% | 14.12% | 12.72% |
| H. | 54.76% | 21.99 | | 24.23% | | 13.42% | |
| I | No Tack | Sl. Tack | | Sl. Tack | | Some Tack | |
| J. | No Tack | Sl. Tack | | Some Tack | | Medium Tack | |

[1]See Table II for step component designation.

The above data indicate that Carbopol® improves emulsion stability but increases moisture absorption, whereas FC-430 decreases moisture absorption but increases emulsion instability.

EXAMPLE X

In the procedure of Example IV, a sealer composition was prepared, the gel formulation and emulsifier formulation were as follows:

| Gel Component | Sample No. 15735-151-2 | | |
|---|---|---|---|
| | Parts By Weight | Grams | % Weight |
| Polybutene H-300 | 1.000 | 27.075 | 6.81 |
| Al Stearate[1] | 0.183 | 4.950 | 1.25 |
| Triethylamine | 0.085 | 2.300 | 0.58 |
| Mineral Spirits | 4.272 | 115.660 | 29.11 |
| Gel Total | 5.540 | 149.980 | 37.75 |
| Emulsion Component | | | |
| Ospstearoc Acid | 0.150 | 4.06 | 1.02 |
| Sorbitan Monolaurate | 0.050 | 1.35 | 0.34 |
| Deionized Water | 8.940 | 241.94 | 60.89 |
| Total | 14.680 | 387.35 | 100.00 |

Note:
[1] No. 5503, Mallinckrodt Specialty Chemicals Co., St. Louis, Mo.

Sample No. 15735-151-2 was divided into Sample Nos. 15735-151-3 and 15735-151-5. To No. 15735-151-2 there was added 0.2 wt %, Carbopol® 1622, and to No. 15735-151-5, there was added 0.2 wt % Carbopol® 934 plus 0.1 wt. % Carbopol® 1622, Cedar blocks were prepared as in Example VIII and tested as 67 and 67A samples, and 68 and 68A samples. Results are in Table IV.

TABLE IV

Cedar Block Water Absorption

| | | Sample No. | | |
|---|---|---|---|---|
| | | 157-151-3 | | 15735-151-5 |
| | | 0.2% Wt. % Carbopol® 1622 | | 0.3 Wt %[1] Carbopol® |
| Step | Component | 67 | 67A | 68 | 68A |
| A. | Block-Screw Eye Assembly | 16.08 g | 17.28 g | 16.68 g | 16.06 g |
| B. | Assembly Plus Coating | 17.30 g | 18.58 g | 17.88 g | 17.20 g |
| C. | Weight of Coating | 1.22 g | 1.30 g | 1.20 g | 1.14 g |
| D. | Coating Weight -% of Total | 8.09% | 7.99% | 7.65% | 7.57% |
| E. | Weight After Immersion | 20.80 g | 22.85 g | 22.07 g | 21.15 g |
| F. | Water Absorbed-Weight | 3.50 g | 4.27 g | 4.19 g | 3.95 g |
| H. | Water Absorbed-% Average | 22.88% | | 24.60% | |
| | Condition of Coatings | | | | |
| I | After 24 hours | Sl. Tack | | Sl. Tack | |
| J. | After 48 hours | Sl. Tack | | Very Sl. Tack | |

Note:
[1] 0.1 wt. % Carbopol® 1622 plus 0.2 wt. % Carbopol® 934

EXAMPLE XI

The formulation of Example VII was tested for water absorption as in the procedure of Example VIII. Samples of 200 grams were prepared as Samples Nos. 15931-24-3 and 15931-24-4. No. 15931-24-3 contained 0.04 grams Fluorad® FC-129 (approximately 230 ppm). No. 15931-24-4 contained 0.04 grams Fluorad® FC-129 plus 0.04 grams Carbopol® 1622 and tested as samples 75 and 75A, and 76 and 76A. Details are in Table V.

TABLE V

Cedar Block Water Absorption

| | | Sample No. | | | |
|---|---|---|---|---|---|
| | | 15931-24-3 | | 15931-24-4 | |
| | | 0.02 Wt. % Fluorad® FC-129 | | 0.02 Wt. % Carbopol® 1622 + 0.02 Wt. % Fluorad® FC-129 | |
| Step | Component | 75 | 75A | 76 | 76A |
| A. | Block-Screw Eye Assembly | 14.84 g | 14.85 g | 15.36 g | 15.43 g |
| B. | Assembly Plus Coating | 16.06 g | 15.99 g | 16.16 g | 16.18 g |
| C. | Weight of Coating | 1.22 g | 1.14 g | 0.80 g | 0.75 |
| D. | Coating Weight-% of Total | 8.80% | 8.21% | 5.56% | 5.18% |
| E. | Weight After Immersion | 18.34 g | 18.58 g | 19.30 g | 18.88 g |
| F. | Water Absorbed-Weight | 2.28 g | 2.59 g | 3.14 g | 2.70 g |
| G. | Water Absorbed-% | 15.12% | 17.24% | 20.67% | 17.74% |
| H. | Water Absorbed-% Average | 16.18% | | 19.20% | |
| | Condition of Coatings | | | | |
| I. | After 24 hours | Medium Tacky | | Some Tacky | |
| J. | After 48 hours | Very Tacky | | Medium Tacky | |

The above data indicate that although water absorption level is acceptable, the tacky surface condition is unacceptable.

EXAMPLE XII

In the procedure of Example IV, a sealer composition was prepared. The gel formulation and emulsifier formulation were as follows:

| Gel Component | Sample No. 15931-26 | | |
|---|---|---|---|
| | Parts By Weight | Grams | % Weight |
| Polybutene H-300 | 1.000 | 27.08 | 6.38 |
| Al Stearate[1] | 0.183 | 4.95 | 1.17 |
| Triethylamine | 0.085 | 2.30 | 0.54 |
| Mineral Spirits | 4.272 | 115.67 | 27.25 |
| Gel Total | 5.540 | 150.00 | 35.34 |
| Emulsifier Compound | | | |
| Refined Linseed Oil | 0.100 | 2.71 | 0.64 |
| Isostearic Acid | 0.150 | 4.06 | 0.96 |
| Sorbitan Monolaurate | 0.050 | 1.35 | 0.32 |
| Deionized Water | 9.840 | 266.43 | 62.76 |
| Total | 15.680 | 424.55 | 100.02 |

Note:
[1] No. 5503, Mallinckrodt Specialty Chemicals Company., St. Louis, MO.

Sample No. 15931-26 was divided into 200 gram samples Nos. 15931-26 and 159-26-2. Sample No. 15931-26 was tested as 77 and 77A. To Sample No. 15931-26-2, there was added 0.04 grams Carbopol® 1622, 0.02 wt. %, Cedar blocks were prepared as in Example VIII and tested as 77 and 77A samples and 78 and 78A samples. Results are in Table VI.

TABLE VI

Cedar Blocks Water Absorption

| | | Sample No. | | | |
|---|---|---|---|---|---|
| | | 15931-26 | | 15931-26-2 | |
| | | | | 0.02 Wt. % Carbopol ® 1622 | |
| Step | Component | 77 | 77A | 78 | 78A |
| A. | Block-Screw Eye Assembly | 14.54 g | 15.17 g | 14.68 g | 15.26 g |
| B. | Assembly Plus Coating | 15.71 g | 16.45 g | 15.59 g | 16.15 g |
| C. | Weight of Coating | 1.17 g | 1.28 g | 0.91 g | 0.89 g |
| D. | Coating Weight-% of Total | 8.62% | 9.01% | 6.63% | 6.22% |
| E. | Weight After Immersion | 18.70 g | 19.01 g | 20.50 g | 20.81 g |
| F. | Water Absorbed-Weight | 2.99 g | 2.56 g | 4.91 g | 4.66 g |
| G. | Water Absorbed-% | 20.28% | 16.54% | 33.56% | 30.60% |
| H. | Water Absorbed-% Average | 18.41% | | 32.11% | |
| | Condition of Coatings | | | | |
| I. | After 24 hours | Slight Tack | | Slight Tack | |
| J. | After 48 hours | Some Tack | | Some Tack | |

The above data indicate that a sealer containing refined linseed oil, isostearic acid and sorbitan monolaurate has an acceptable level of water absorption but a level of tackiness remains which makes the formulation unacceptable. The addition of Carbopol ® 1622 also increased the water absorbed.

EXAMPLE XIII

In the procedure of Example IV, a sealer composition was prepared. The gel formulation and emulsifier formulation were as follows:

| | Sample No. 15931-82 | | |
|---|---|---|---|
| Gel Component | Parts By Weight | Grams | % Weight |
| Polybutene H-300 | 1.000 | 15.27 | 2.46 |
| Al Stearate[2] | 0.400 | 6.11 | 0.98 |
| Triethylamine | 0.186 | 2.84 | 0.46 |
| Turpentine | 2.998 | 45.78 | 7.36 |
| Gel Total | 4.584 | 70.00 | 11.26 |
| Emulsion Component | | | |
| Isostearic Acid | 0.150 | 2.29 | 0.37 |
| Sorbitan Monolaurate | 0.050 | 0.76 | 0.12 |
| Adipic Acid Ester[1] | 0.250 | 3.82 | 0.61 |
| Deionized Water | 35.686 | 544.94 | 87.64 |
| Total | 40.320 | 621.81 | 100.00 |

Note:
[1] Smithol 50, Werner G. Smith, Inc., Cleveland, OH.
[2] No. 5503, Mallinckrodt Specialty Chemicals Co., St. Louis, Mo.

The above emulsion, after 24 hours at room temperature, indicated no separation. After 48 hours there was evidence of a mild separation of phases which had not increased after 96 hours at room temperature.

Test specimens were prepared in the procedure of Example VIII to determine water absorption and condition of the sealer coatings and tested as Sample No. 15931-82. Results are in Table VII.

TABLE VII

Cedar Block Water Absorption

| | | Sample No. 15931-82 | |
|---|---|---|---|
| Step | Component | 108 | 108A |
| A. | Block-Screw Eye Assembly | 15.30 g | 14.93 g |
| B. | Assembly Plus Coating | 16.14 g | 15.73 g |
| C | Weight of Coating | 0.84 g | 0.80 g |
| D. | Coating Weight-% of Total | 5.87% | 5.73% |
| E. | Weight After Immersion | 20.41 g | 20.38 g |
| F. | Water Absorbed-Weight | 4.27 g | 4.65 g |

TABLE VII-continued

Cedar Block Water Absorption

| | | Sample No. 15931-82 | |
|---|---|---|---|
| Step | Component | 108 | 108A |
| G. | Water Absorbed-% | 28.18% | 31.50% |
| H. | Water Absorbed-% Average | 29.84% | |
| | Condition of Coatings | | |
| I. | After 24 hours | No Tack | No Tack |
| J. | After 48 hours | No Tack | No Tack |

The above data indicate that an adipic acid ester of a linear alcohol improves emulsion stability but increases moisture absorption.

That which is claimed is:

1. A $C_4$ linear polymer water-based wax-free stable emulsion composition used as a sealer for wood, concrete, porous materials first prepared as a stable gel wherein said gel has a viscosity of less than about 5000 centipoise at room temperature from a non-hydrogenated liquid homopolymer selected from the group consisting of polybutene and polyisobutylene with a number average molecular weight of from about 300 to about 10,000, a gel-forming metal soap of a carboxylic acid of from about 12 to about 20 carbon atoms, an amine to reduce the viscosity of said gel selected from the group consisting of triethylamine, triethanolamine and morpholine, a hydrocarbon solvent, an emulsifier which is optionally a nonionic emulsifier, a cationic emulsifier, an anionic emulsifier and mixtures thereof, and an emulsifying-stablizing agent consisting of an acrylic acid copolymer crosslinked with a polyalkenyl polyether wherein said liquid homopolymer is present in an amount of less than 10 wt. percent, said metal soap is present in an amount of from about 1 wt % to 5 wt %, said amine is present in an amount of from about 0.1 wt. % to 2.0 wt. %, said emulsifier in an amount of from about 0.5 wt. % to about 5 wt. %, said emulsifying-stabilizing agent is present in an amount of from about 0.02 wt. % to about 2.0 wt. %, and said hydrocarbon solvent is present in an amount less than about 35 weight percent of the emulsion composition, wherein said amounts are in percentages of the weight of the water emulsion wherein pH of said emulsion composition is within the range of from about 7 to about 10.

2. The polymer emulsion composition of claim 1 wherein said hydrocarbon solvent is selected from the group consisting of turpentine, mineral spirits and mixtures thereof.

3. The polymer emulsion composition of claim 1 wherein said metal soap is formed by metals selected from the group consisting of aluminum, calcium, cobalt, lead and zinc.

4. The polymer emulsion composition of claim 1 wherein said gel is prepared in the presence of an emulsifier selected from the group consisting of a sorbitan fatty acid ester, isostearic acid, oleic acid, lauric acid, tall oil fatty acids, tallow fatty acids, hydrogenated tallow fatty acids, and mixtures thereof.

5. The polymer emulsion composition of claim 1 wherein said metal soap is an aluminum distearate comprising about 95% distearate and about 5% monostearate.

6. The polymer emulsion composition of claim 1 wherein said emulsifier is a cationic emulsifier and is selected from the group consisting of triethylamine, triethylanolamine, morpholine and mixtures thereof.

7. The polymer emulsion composition of claim 1 which contains a fluorinated surfactant for water repellancy.

8. The polymer emulsion composition of claim 1 wherein said emulsifier is an anionic emulsifier and is selected from the group consisting of isostearic acid and oleic acid, said anionic emulsifier being present in an amount of from about 1 wt. % to about 5 wt. % of the weight of the final emulsion.

9. The polymer emulsion composition of claim 1 wherein said homopolymer is a polybutene of number average molecular weight of from about 300 to about 3000, said metal soap is an aluminum stearate, said amine is selected from the group consisting of triethylamine and triethanolamine, said hydrocarbon solvent is selected from the group consisting of mineral spirits and turpentine, and said stable emulsion is prepared in the presence of an emulsifier and an emulsifying-stabilizing agent.

10. The polymer emulsion composition of claim 9 wherein said emulsifier is a sorbitan fatty acid ester.

11. The polymer emulsion composition of claim 9 wherein said emulsifying-stabilizing agent is an acrylic acid copolymer crosslinked with a polyalkenyl polyether.

12. The polymer emulsion composition of claim 9 wherein said emulsifying-stabilizing agent is a low molecular weight diester of a linear alcohol of from 6 to 12 carbon atoms and a mono-, di- and tricarboxylic acid of 6 to 12 carbon atoms.

* * * * *

UNITED STATES PATENT AND TRADEMARK OFFICE
CERTIFICATE OF CORRECTION

PATENT NO.: 5,346,943

DATED: September 13, 1994

INVENTOR(S): Sohan L. Khungar, Martin Graves, Jr., Robin M. Gryziecki

It is certified that error appears in the above-identified patent and that said Letters Patent is hereby corrected as shown below:

| Col. | Line | |
|---|---|---|
| 4 | 6 | "a heavy metal soap," should read --a metal soap-- |
| 4 | 28 | "a heavy metal." should read --a metal.-- |
| 4 | 59 | "The heavy metal soap" should read --The metal soap-- |
| 7 | 27 | "sorbitan esters" should read --sorbitan fatty acid esters-- |
| 7 | 50 | "a heavy metal soap" should read --a metal soap-- |
| 7 | 53 | "A preferred heavy metal soap" should read --A preferred metal soap-- |
| 9 | 67 | "Witconol™ 2650$^5$" should read --Witconol 2650$^5$-- |
| 14 | 52 | in Table III, under the column "71A" and in the line "G." patent reads "23.23%" |

UNITED STATES PATENT AND TRADEMARK OFFICE
CERTIFICATE OF CORRECTION

PATENT NO.: 5,346,943
DATED: September 13, 1994
INVENTOR(S): Sohan L. Khungar, Martin Graves, Jr., Robin M. Gryziecki It is certified that error appears in the above-identified patent and that said Letters Patent is hereby corrected as shown below:

| Col. | Line | |
|---|---|---|
| | | patent should read --24.23%-- |
| 14 | 59 | "The above data indicate" should read --The above data and the data of Example VI indicate-- |
| 15 | 11 | "Ospstearoc Acid" should read --Isostearic Acid-- |
| 15 | 40 | in Table IV, after the line "F. Water Absorbed-Weight" and before the line "H. Water Absorbed-% Average" insert the following line --G. Water Absorbed-%  21.47%  24.29%  24.82%  24.38%-- |
| 17 | 46 | in the line "Total" patent reads "40.320" patent should read --40.720-- |

UNITED STATES PATENT AND TRADEMARK OFFICE
CERTIFICATE OF CORRECTION

PATENT NO.: 5,346,943
DATED: September 13, 1994
INVENTOR(S): Sohan L. Khungar, Martin Graves, Jr., Robin M. Gryziecki It is certified that error appears in the above-identified patent and that said Letters Patent is hereby corrected as shown below:

| Col. | Line | | | |
|------|------|---|---|---|
| 17 | 48 | "$^1$Smithol 50," | should read | --$^2$Smithol 50-- |
| 17 | 49 | "$^2$No. 5503," | should read | --$^1$No. 5503,-- |

Signed and Sealed this

Twentieth Day of December, 1994

Attest:

BRUCE LEHMAN

Attesting Officer

Commissioner of Patents and Trademarks